US011831753B2

(12) United States Patent
Ng et al.

(10) Patent No.: US 11,831,753 B2
(45) Date of Patent: Nov. 28, 2023

(54) SECURE DISTRIBUTED KEY MANAGEMENT SYSTEM

(71) Applicant: Foris Limited, Sai Wan (HK)

(72) Inventors: Ming Sum Sam Ng, Sai Wan (HK); Matthew David Chan, Sai Wan (HK); Wai King Jason Lau, Sai Wan (HK); Siu Kei Thomas Kung, Sai Wan (HK)

(73) Assignee: Foris Limited, San Wan (HK)

( * ) Notice: Subject to any disclaimer, the term of this patent is extended or adjusted under 35 U.S.C. 154(b) by 255 days.

(21) Appl. No.: 17/040,359

(22) PCT Filed: Dec. 3, 2019

(86) PCT No.: PCT/CN2019/122605
§ 371 (c)(1),
(2) Date: Sep. 22, 2020

(87) PCT Pub. No.: WO2020/114377
PCT Pub. Date: Jun. 11, 2020

(65) Prior Publication Data
US 2021/0028931 A1  Jan. 28, 2021

(30) Foreign Application Priority Data

Dec. 3, 2018 (HK) .................................. 18115417.3

(51) Int. Cl.
*H04L 9/08* (2006.01)
(52) U.S. Cl.
CPC .......... *H04L 9/0825* (2013.01); *H04L 9/0866* (2013.01); *H04L 9/0877* (2013.01); *H04L 2209/80* (2013.01)
(58) Field of Classification Search
CPC ... H04L 9/0825; H04L 9/0866; H04L 9/0877; H04L 2209/80
(Continued)

(56) References Cited

U.S. PATENT DOCUMENTS 6,636,968 B1 * 10/2003 Rosner .................. H04L 9/0833
713/178
6,694,025 B1 * 2/2004 Epstein ................. H04L 9/0894
380/278
(Continued)

FOREIGN PATENT DOCUMENTS

| CN | 104205899 | 12/2014 |
| CN | 107515217 | 12/2017 |
| CN | 109379184 | 2/2019 |

OTHER PUBLICATIONS

International Search Report for International Application No. PCT/CN2019/122605 dated Mar. 22, 2019.

*Primary Examiner* — Moeen Khan
(74) *Attorney, Agent, or Firm* — Warner Norcross + Judd LLP (57) ABSTRACT

A distributed key management system, which contains a server, a plurality of key-holding devices adapted to communicate with the server; and a key-requesting device adapted to communicate with the server. Each one of the plurality of key-holding devices is adapted to hold a different fragment of a private key. The server is adapted to reconstruct the private key based on the fragments received from the plurality of key-holding devices. The key-requesting device is adapted to obtain the private key from the server. The systems according to the invention provide a zero-trust model key management scheme and would eliminate the risk of key leakage to unauthorized person while providing flexibility of authorizing devices.

11 Claims, 7 Drawing Sheets

(58) Field of Classification Search
USPC .......................................................... 380/277
See application file for complete search history.

(56) References Cited

U.S. PATENT DOCUMENTS

| | | | | |
|---|---|---|---|---|
| 7,978,858 | B2* | 7/2011 | Osajima | H04L 9/0833 |
| | | | | 380/278 |
| 8,074,078 | B2* | 12/2011 | Brown | H04L 9/14 |
| | | | | 380/30 |
| 9,667,416 | B1* | 5/2017 | Machani | H04L 9/3215 |
| 9,954,684 | B2* | 4/2018 | Popa | H04L 63/064 |
| 10,305,873 | B2* | 5/2019 | Fu | H04L 9/0855 |
| 10,516,527 | B1* | 12/2019 | Machani | H04L 9/0625 |
| 2007/0160198 | A1 | 7/2007 | Orsini et al. | |
| 2008/0137857 | A1 | 6/2008 | Bellare et al. | |
| 2013/0254519 | A1 | 9/2013 | Benoit et al. | |
| 2014/0020081 | A1* | 1/2014 | Zhang | H04L 63/0853 |
| | | | | 726/9 |
| 2016/0086272 | A1* | 3/2016 | Baker | G06Q 40/04 |
| | | | | 705/37 |
| 2017/0019385 | A1 | 1/2017 | Yoo | |
| 2017/0142098 | A1* | 5/2017 | Nataros | H04L 63/061 |
| 2017/0185836 | A1* | 6/2017 | Okumura | G06V 30/194 |
| 2020/0106612 | A1* | 4/2020 | Baba | H04W 12/009 |
| 2020/0153614 | A1* | 5/2020 | Srinivasan | H04L 9/0668 |

* cited by examiner

SECURE DISTRIBUTED KEY MANAGEMENT SYSTEM

FIELD OF INVENTION

This invention relates to a private key management system, and in particular to distributed key management systems.

BACKGROUND OF INVENTION

The financial services industry has strict regulations on data confidentiality and integrity, and data is often protected on computing devices using private keys for encryption. Traditionally, an HSM (hardware security module) would be used to store the private keys, with the belief that the HSM provides adequate security.

However, in today's world, it's not a matter of if a computer system will be breached, it's a matter of when. With the concept of assumed breach in mind, an HSM fails to provide the necessary security when the private keys it is holding are used to guard assets worth hundreds of millions of dollars—such as private keys to wallets for cryptocurrency companies. When an HSM is restarted, it still either requires a PIN, password, or a digital certificate to a trusted server. All of the above are points of failure that either involve trusting a single human, or trusting a server that may already be breached by external or insider threats.

SUMMARY OF INVENTION

Thus, there exists a need for a secure, zero-trust model system to store sensitive data, where no single actor, no matter human or machine, has knowledge of the full data.

In the light of the foregoing background, it is an object of the present invention to provide an alternate private key management system which eliminates or at least alleviates the above technical problems.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect, is a distributed key management system, which contains a server, a plurality of key-holding devices adapted to communicate with the server; and a key-requesting device adapted to communicate with the server. Each one of the plurality of key-holding devices is adapted to hold a different fragment of a private key. The server is adapted to reconstruct the private key based on the fragments received from the plurality of key-holding devices. The key-requesting device is adapted to obtain the private key from the server.

Preferably, the server is further adapted to reconstruct the private key based on the fragments received from at least a part of the plurality of key-holding devices.

More preferably, the server is adapted to reconstruct the private key using Shamir's Secret Sharing algorithm over Galois Field 256.

According to a variation of the preferred embodiments, the private key is a random number or is constructed using a random number, and the private key is within a 0-255 bytes range.

According to another variation of the preferred embodiments, the key-requesting device is adapted to produce a final key based on the private key received from the server such that the server has no access to the final key.

According to another variation of the preferred embodiments, the server is configured to conduct an operation related to the private key only when the server has been unlocked using an encryption key held on the plurality of key-holding devices.

Preferably, the server is adapted to hold a configuration file which is compulsory for conducting the operation. The configuration file is associated with a respective public key for each one of the plurality of key-holding devices. The server is adapted to be unlocked using the encryption key held on one of the plurality of key-holding devices and a corresponding public key for the one of the plurality of key-holding devices.

In one implementation, the server is locked when it has been restarted.

In another implementation, the operation is adding a new key-holding device; removing one of the plurality of the key-holding devices; generating a new private key; or approving a request from the key-requesting device.

According to a further variation of the preferred embodiment, the server is configured to recalculate the key fragments when a new key-holding device joins the plurality of key-holding devices, and afterwards distribute the new key fragments to the plurality of key-holding devices and the new key-holding device.

According to a further variation of the preferred embodiment, the server is configured to remove one of the plurality of the key-holding devices from being able to communicate with the server when a predetermined number of other key-holding devices authorize a removal.

In one implementation, the key-holding devices are portable computing devices.

In another implementation, the key-holding devices are adapted to encrypt their respective fragments using a biometric authentication.

According to another aspect of the invention, there is provided a method for distributively managing keys. The method contains the steps of generating a private key by a server, appointing a plurality of key-holding devices, splitting the private key into a plurality of fragments in accordance with a number of the key-holding devices; and distributing a different one of the fragments to each one of the plurality of key-holding devices.

Preferably, the private key is a random number or is constructed using a random number, and the private key is a byte array with byte value in 0-255 range.

More preferably, the method further contains the step of encrypting a respective one of the fragments by one of the plurality of key-holding devices using a biometric authentication.

According to a variation of the preferred embodiments, the appointing step further contains registering a first one of the plurality of the key-holding devices using a PIN; and registering the rest of the plurality of the key-holding devices by approval of all or a predefined minimum number of the plurality of the existing key-holding devices.

According to another variation of the preferred embodiments, the splitting step is conducted using Shamir's Secret Sharing algorithm over Galois Field 256.

According to a further variation of the preferred embodiments, the method further comprises the step of recalculating the key fragments when a new key-holding device joins the plurality of key-holding devices; and afterwards distributing the private key to the plurality of key-holding devices and the new key-holding device.

According to a third aspect of the invention, there is disclosed a method for reconstructing a private key from a plurality of key-holding devices. The method contains the steps of receiving fragments of the private key from the plurality of key-holding devices by a server; and reconstructing the private key by the server.

Preferably, in the reconstructing step mentioned above the server reconstructs the private key based on the fragments received from at least a part of the plurality of key-holding devices.

More preferably, the method further contains the step of authenticating by a user, on each one of the plurality of key-holding devices, before sending a corresponding fragment to the server.

According to a variation of the preferred embodiments, the method further contains the step of producing a final key by a key-requesting device after it receives the private key from the server, such that the server has no access to the final key.

There are many advantages to the present invention. First of all, the key management system adopts a zero-trust model, since no single party in the system such as the server or any one of the key-holding devices alone is able to access the private key that is being protected. Rather, each key-holding device only holds a fragment of the private key, so individually the key-holding device does not know what the full private key is. For example, an owner of a company that acts as a key master would not and should not know a critical private key for cryptographically sign all transactions. The server is also unable to access the full private key as multiple m-of-n key-holding devices have to "approve" the use of a private key before it is reconstructed on the server and then sent to a key-requesting device such as a computer system. Even if the key is successfully reconstructed by the server, what the server sees is not the final key that is desired by the key-requesting device, as only the key-requesting device could decrypt the private key to obtain the final key. This mitigates collusion, and creates barriers to the key being exposed as no single point in this invention has the full, final key.

In addition, the invention, while providing the distributed key fragment storage to achieve zero-trust model, also provides a desired failover and redundancy which makes the invention more realistic to real-world issues. In particular, the m-of-n model adopted for distributively storing the fragments allow the private key still to be reconstructed if one or even more of the key-holding devices is lost, damaged, or otherwise not able to perform the key reconstruction operation. Once any m of n of the key-holding devices have deployed their key fragments, then the private key is reconstructed on the server.

Another advantage of the present invention is that the invention provides a reliable, distributed way of managing operations related to the private key and the key-holding devices. For example, a new key-holding device could request or be pulled to be added to the key management system, but whether it can be added depends on results of approval by a sufficient number of existing key-holding devices. Except for the first key-holding device, if the second or further key-holding device wants to join the system then approval from existing key-holding device(s) must be obtained. Likewise, if an existing key-holding device is lost or damaged and must be removed from being able to communicate with the server, this also requires a sufficient number of existing key-holding devices to approve.

The private key that can be protected using the system and method of the invention can be any random number, and this provides a broad application of the invention. In addition, all the communications between different parties in the system are strongly protected. In exemplary embodiments, the key fragment on the key-holding device can be protected by a biometric authentication, the access to a configuration file on the server is protected by asymmetric authentication, and the all network communications between the parties are running on Hypertext Transfer Protocol Secure (HTTPS) protocol. On top of HTTPS, all messages are further end-to-end encrypted. These measures further reinforce the data security of the private key on the basis of the distributive key management.

BRIEF DESCRIPTION OF FIGURES

The foregoing and further features of the present invention will be apparent from the following description of preferred embodiments which are provided by way of example only in connection with the accompanying figures, of which.

In the drawings, like numerals indicate like parts throughout the several embodiments described herein.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Figure 1:
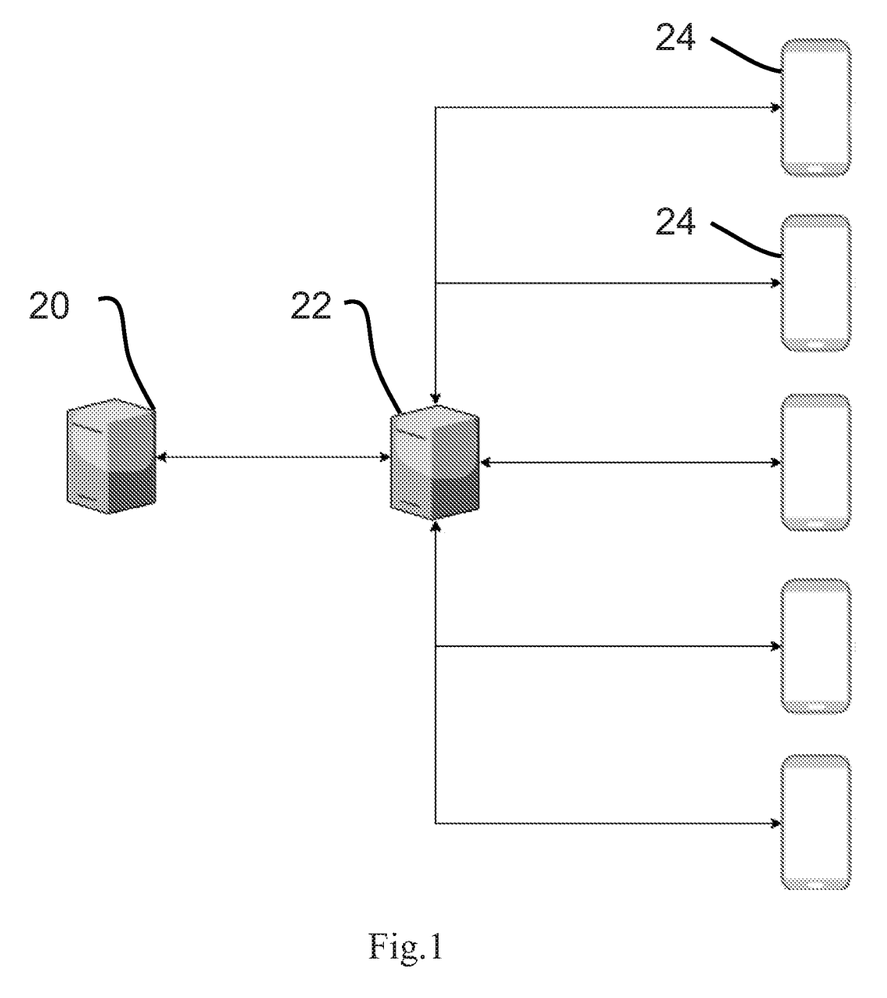
FIG. 1 is an illustration of a distributed key management system according to an embodiment of the invention.

Referring now to FIG. 1, the first embodiment of the present invention is a distributed key management system which contains a server 22, a key consumer 20, and a plurality of key masters 24. The key consumer 20 is a key-requesting device that is adapted to communicate with the server 22 to request a main private key therefrom that is held distributively. Behind the key consumer 20 there may be a real person which request the main private key or there may be just computer (automated) programs. The main private key is the ultimate item that the distributed key management system protects, and it should be distinguished from other private keys belonging to the server 22, the key consumer 20, or the key masters 24 that are used to decrypt a message together with a respective public key, as will be described below. The key masters 24 are key-holding devices that each hold a different fragment of the main private key (which will be described in more details later). Behind the key masters 24 there are real persons operating the key masters 24. The server 22 is connectable with the key consumer 20 through any existing data networks or links such as the Internet, Local Area Network (LAN), Wide Area Network (WAN), that are implemented using any existing communication technologies such as cellular networks, Bluetooth, Wi-Fi, Wi-Max, etc. Likewise, the plurality of key masters 24 is also connectable with the server 22 through any data networks or links. Both the key consumer 20 and the key masters 24 may be any type of computing devices, either portable or fixed, and which have communication capabilities as mentioned above. For example, the key consumer 20 could be a computer system. However, the key masters 24 should belong to different persons/entities otherwise this will defeat the purpose of having different, distributed key management parties. For example, the key masters 24 can be smartphones belonging to different users.

Figure 2:
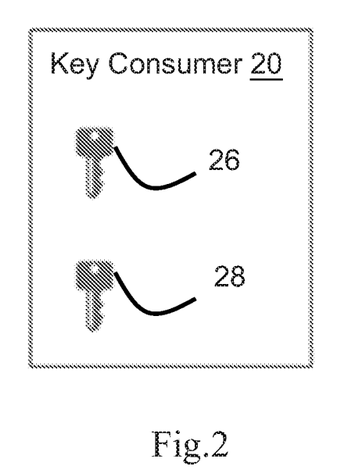
FIG. 2 shows illustratively components of the key consumer in FIG. 1.

Turning now to FIG. 2. The key consumer 20 possesses at least two keys for the purpose of communicating with the server 22 and generating a final key that is required by the key consumer 20 respectively. In particular, the key consumer 20 possess a private key 26 of the key consumer 20 for decrypting all messages sent by the server 22 to the key consumer 20 in relation to the distributed key, where these messages are always encrypted by the server 22 using a public key (not shown) of the key consumer 20. On the other hand, the key consumer 20 possesses a dedicated decryption key 28 to decrypt the main private key successfully obtained from the server 22, resulting the final key, as will be described in details later.

Figure 3:
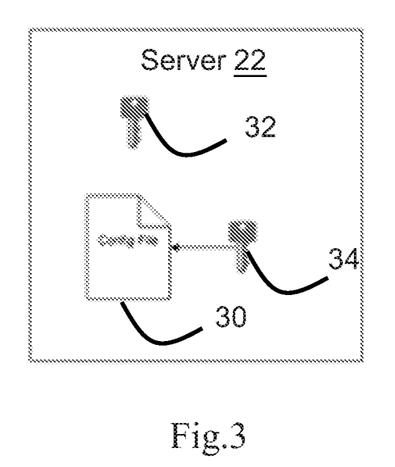
FIG. 3 shows illustratively components of the server in FIG. 1.

Turning now to FIG. 3. The server 22 has a configuration file 30 stored therein, and also the server 22 possesses at least two keys for the purpose of communicating with the key consumer 20 or the key masters 24, and encrypting the configuration file 30. In particular, the server 22 possess a private key 32 of the server 22 for decrypting all messages sent by the key consumer 20 or the key masters 24 in relation to the distributed key, where these messages are always encrypted by the key consumer 20 or the key masters 24 using a public key (not shown) of the server 22. On the other hand, the server 22 possesses an encryption key 34 to encrypt the configuration file 30, and the server 22 shares the encryption key 34 with all key masters 24 that are registered with the server 22. The configuration file 30 which stores public keys of all registered key masters 24 is not permanent in that it can be deleted at any time and re-established by the server 22. If the server 22 needs to restart, it can't read the configuration file 30 and therefore it will require any key master 24 to unlock the server 22 by providing the encryption key 34 of the configuration file 30. Before the server 22 is unlocked, it cannot do anything except waiting to be unlocked. This prevents any unauthorized restart or code modification to the server 22 itself.

Figure 4:
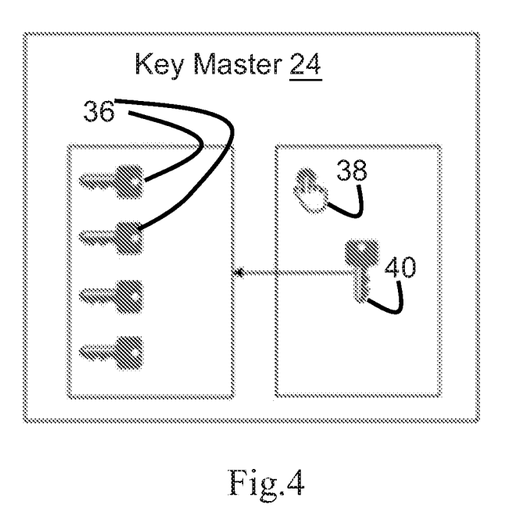
FIG. 4 shows illustratively components of the key master in FIG. 1.

Turning to FIG. 4, a key master 24 possess a private key 40 of the key master 24 that is both used to decrypt message encrypted by a public key (not shown) of the key master 24 and sent to the key master 24 by the server 22, and to control the access to key fragment(s) 36 stored in the key master 24. As mentioned above the server 22 stores the public key of registered key masters 24 so the server 22 is able to encrypt using a respective public key the messages sent to a particular key master 24. The key fragment(s) 36 are segments of main private key(s) that are managed and protected by the distributed key management system, and the key fragment (s) 36 on a same key master 24 belong to different main private keys and are independent from each other. In addition to the private key 40, to access the key fragment(s) 36 a further biometric authentication is required for a user of the key master 24. An example means for implementing the biometric authentication is the fingerprint module 38. The key fragment(s) 36 and the private key 40 are stored in a secure storage of the key master 24.

Figure 5A:
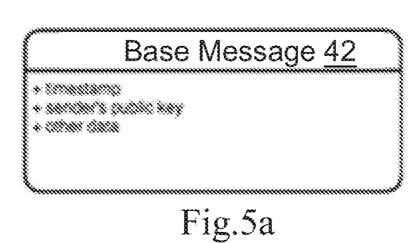
FIGS. 5a and 5b show respectively the contents of a base message sent between the parties in FIG. 1 and an encrypted version of the base message.
Figure 5B:
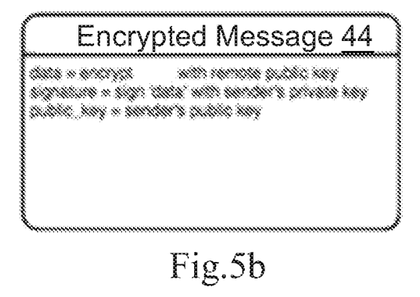

In the system shown in FIG. 1, as mentioned above all communications, at least with regards to the main private key, are encrypted using a public key (not shown) of the recipient and are decrypted on the recipient using its private key. Communication of these messages are therefore end-to-end encrypted. FIG. 5a shows an example of a base message 42 which contains at least the contents of a timestamp, the sender's public key, and other data (e.g. the key fragment). The timestamp is present to prevent replay attacks. Before transmission, the base message 42 is then encrypted with recipient's public key, and this encrypted data is then signed by the sender's private key. The resulted encrypted message 44, also called an envelope message, is then sent to the other party of the communication. The sender's public key in the encrypted message 44 is to allow the recipient of the encrypted message 44 to determine if the sender is an authorized sender or not. The sender's public key in the base message 42 is to make sure there is no man-in-the-middle attack that strips away the envelope signature which could be replaced by the attacker's signature. In an example, if a message is to be sent from a key master 24 to the server 22, then a base message 42 containing the public key of the key master 24 is encrypted using the public key of the server 22 by the key master 24, and is also signed using the private key 40 of the key master 24. The encrypted message 44 also contains the public key of the key master 24.

Figure 6:
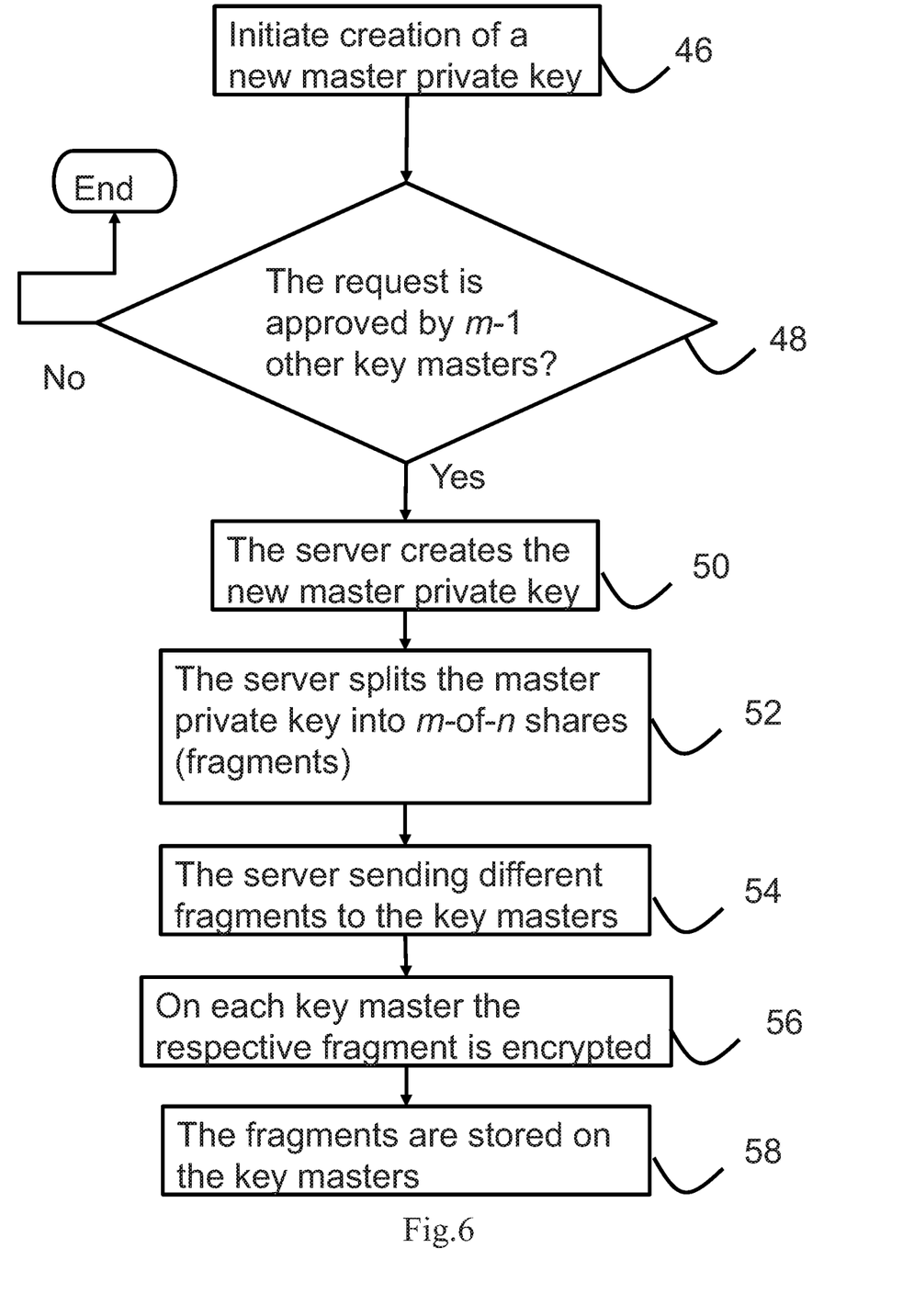
FIG. 6 is a flowchart of how to create a private key, split it, and distribute the fragments to multiple key masters in the system of FIG. 1.

Now turning to the operation of the distributed key management system described above in FIGS. 1-5b. FIG. 6 shows the steps of creating a new master private key that is managed and protected by the distributed key management, and how the master private key is split and stored distributively in a plurality of key masters 24. In Step 46, any one of registered key masters 24 initiates the creation of the new master private key. However, it is the server 22 which is the actual party to create the new master private key. Once the request is initiated, then the request needs to be further approved by m−1 more key masters 24 in Step 48, where m is a number smaller than n and n stands for the number of registered key master 24 in the distributed key management system. In this particular embodiment as shown in FIG. 1 there are five key masters 24 so n equals to 5. For the purpose of illustration, assume that m=3, then to approve the creation of the new master private key two other key masters 24 beside the initiating key master 24 have to consent. The server 22 will then create a new master private key in Step 50 when enough approval has been received.

The master private key is generated by the server 22 using cryptographically strong pseudo-random number generator. Almost all symmetric encryption keys (such as AES) and Elliptic-Curve Cryptography (ECC) private keys (which just need to be a random number rounded by a modulo number) are random numbers. But, a random number cannot be directly used by many Public Key Infrastructures (PKI) as a private key because the private key usually needs to be a prime number (not just any random number), nor can be used as a regular password that are assigned by 3rd party vendors (such as the API access key of a cloud service provider). However, the former (e.g. RSA private key) can be solved by using the generated random number as the seed to generate a prime number and the latter can be solved by using the generated random number to encrypt the assigned password. Therefore, the server 22 is able to initialize a random number for almost all applications in which a private key is required.

After the main private key is created, the server 22 in Step 52 then split the main private key uses Shamir's Secret Sharing (Adi Shamir, 1979) over Galois Field (GF) 256 into m-of-n shares (3-of-5 in the example mentioned above). GF(256) allows splitting a key of arbitrary length because unlike regular Shamir's Secret Sharing implementations, which are usually based on a large prime number and therefore cannot handle secret larger than that predefined prime number, GF(256) operates on full 0-255 bytes range and therefore can split an arbitrary long secret on a byte-by-byte basis. The combination of Shamir's Secret Sharing and the GF(256) then could handle the main private key that is a random number with arbitrary byte length. Each share resulted from the splitting then becomes a fragment 36 of the main private key. This means the main private key will be split as n fragments 36 and distributed to 'n' different key masters and any 'm' key masters can reconstruct the full main private key. As a result, the distributed key management system can still operate when one or more, up to n−m, key master(s) 24 are lost, damaged or otherwise not functional.

Next, in Step 54 the fragments 36 are sent to/downloaded the registered key masters 24 for storage. In the example mentioned above in total 5 fragments 36 are sent to five key masters 24. However, the key fragments 36 are encrypted in Step 56 before being stored on the key masters 24 and as mentioned above the public key of each key master 24 is used to encrypt the fragment 36 to be stored on the key master 24, and the fragment 36 is further protected with biometric authentication to approve the use of the key. In an example, the private key of the key master 24 is a 2048-bits Rivest-Shamir-Adleman (RSA) key, and the encryption/decryption involve creating an ephemeral Advanced Encryption Standard (AES) key and use AES/GCM (Galois/Counter Mode) to encrypt/decrypt the data.

Once the encryption of the fragment 36 is completed, the fragment 36 is then stored on the respective key master 24 in Step 58, tier example in a secure storage of the key master 24. The newly generated main private key will not be marked as ready until all key masters 24 have downloaded their corresponding key fragments 36. The creation and distribution of the main private key is now completed and the main private key is effectively held in and protected by the distributed key management system.

It should be noted that the above main private key creation process can be repeated for more master private keys 46 because as mentioned above each key master 24 is adapted to host one or more key fragments.

Figure 7:
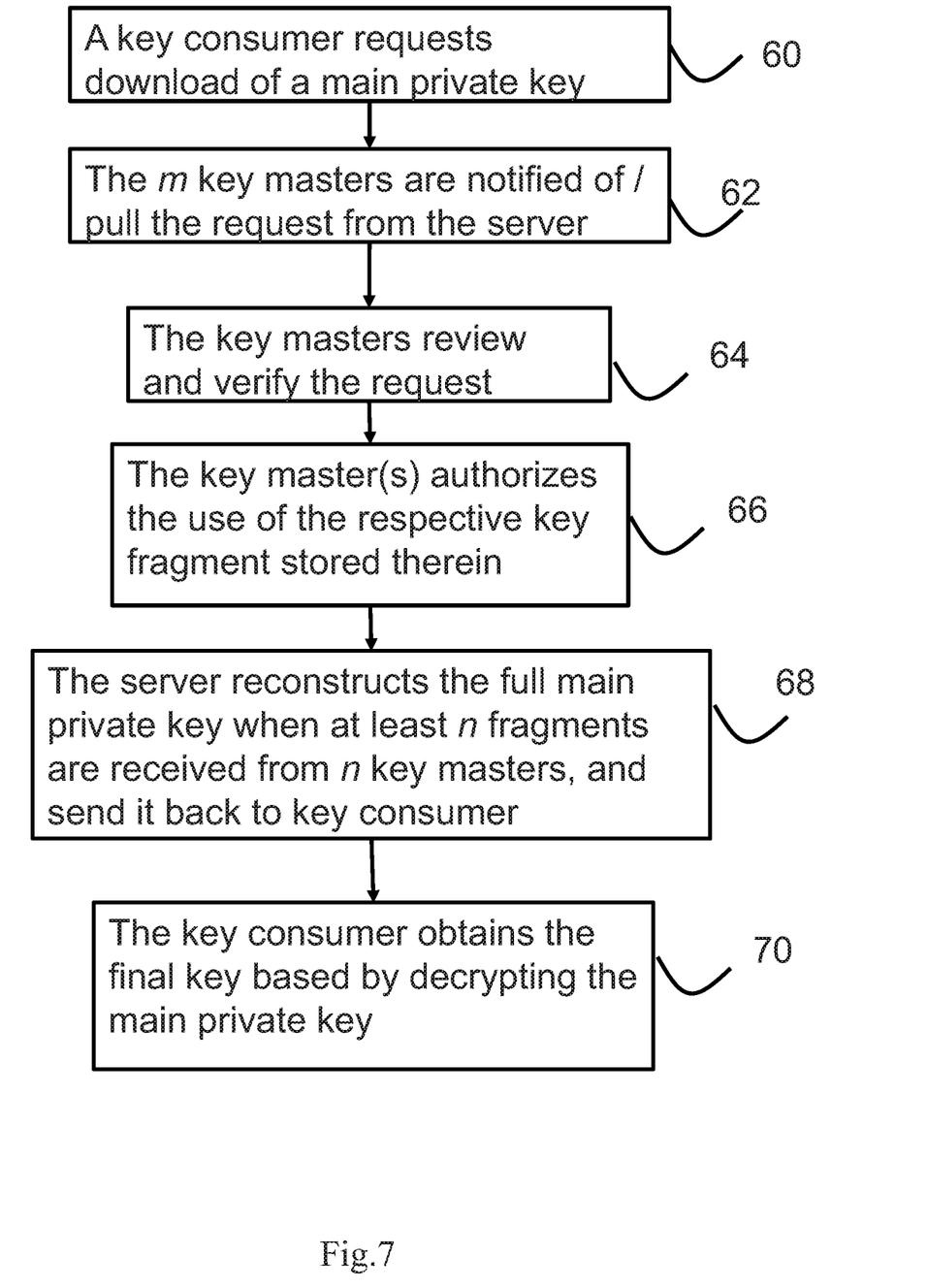
FIG. 7 is a flowchart of how a key consumer requesting a private key from the server in the system of FIG. 1.

Turning now to FIG. 7 which shows the steps of how a key consumer 20 in the system of FIG. 1 could request a main private key from the distributed key management system. In Step 60 the key consumer 20 when needs to access a main private key stored in the distributed key management system sends a request to the server 22. The key server 22 will then reply with a ticket number and the key consumer 20 can ask for the main private key in the subsequent requests using this ticket number. Then, in Step 62 the server 22 passively waits for the key masters 24 to pull pending request(s). After a key master 24 receives the pending request, the user of the key master 24 in Step 64 can review the request and verify if this request is legitimate (e.g. there is a scheduled restart of the key consumer 20 so the main private key is needed). If the request is approved, then in Step 66 the user of the key master 24 will use his/her fingerprints to authorize the use of his/her own private key to decrypt the encrypted key fragment 36, and then send it to the server 22. Then, if the key consumer 20 asks for the main private key using the previously generated ticket number, and enough key fragments 36 have been received by the server 22 with a limited time frame, the server 22 in Step 68 then runs Shamir's Secret Sharing algorithm to reconstruct the main private key and sends it back to the key consumer 20. Lastly, when the key consumer 20 obtains the main private key from the server 22, it will "decrypt" the main private key in Step 70 by using the dedicated decryption key 28. Note that this secret (the main private key) is just a random number and is not encrypted by the key consumer 20 when it was generated by the server 22, and the "decrypt" function in here is actually a "bit scrambling" function to make sure the final key is not the same as the data in the main private key provided by the server 22. This makes it that even the server 22 will not know the content of the final key and only the key consumer 20 knows the final key. In an example, this "decrypt" function is an RSA sign function.

Figure 8:
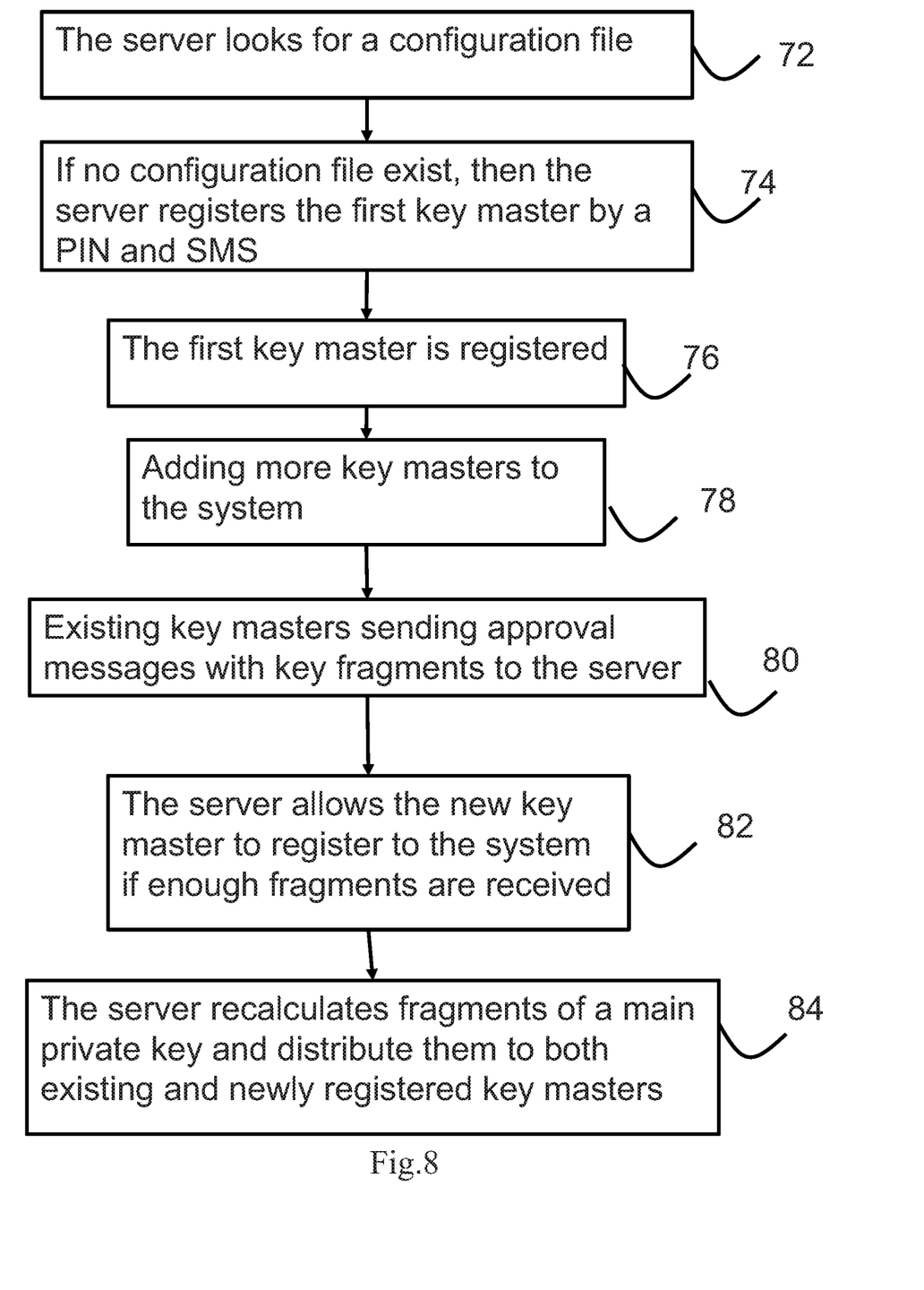
FIG. 8 is a flowchart of how to appoint the first and further key masters in the system of FIG. 1.

FIG. 8 shows the steps of how to appoint a first key master in a dedicated key management system and how to add further key masters in the system of FIG. 1. For an existing dedicated key management system apparently to add further key masters the method does not has to start from the beginning of FIG. 8. Note that the server 22 will only communicate with a registered key master. Assume that initially in the dedicated key management system no key master has been registered with the server 22 (for example when the server 22 is started for the first time), the server will try to read the configuration file 30 at a predefined location in Step 72. If the configuration file 30 does not exist (which is the case when no key master has been registered), then in Step 74 the server 22 generates a random PIN and send an SMS to a predefined phone number belongs to the first key master 24. The first key master 24 is registered by using this PIN in Step 76. After the first registration, the key master 24 can then add more key masters in Step 78. In particular, when adding a new key master 24 to the system, any existing key master 24 can initiate a request by submitting the new key master's public key to the server 22. Then, other existing key masters 24 in Step 80 send approval messages if it approves the addition of the new device and an approval message will include the necessary key fragment 36 held by the existing key master 24. When enough fragments 36 are received by the server 22 with a limited time frame, the server 22 allows the new key master 24 to register to the system in Step 82. The server 22 in Step 84 then re-calculates the share secrets (i.e. split the original main private key according to the new number of key masters 24 again) and redistribute it to all key masters 24 (both new and existing key masters). The re-calculation is needed as the new key master 24 needs to have a copy of a key fragment 36 as well, and this will require the system to reconstruct the main private key based on received, old fragments 36 and get new fragment 36. The main private key is then held by the new formation of key masters 24.

Figure 9:
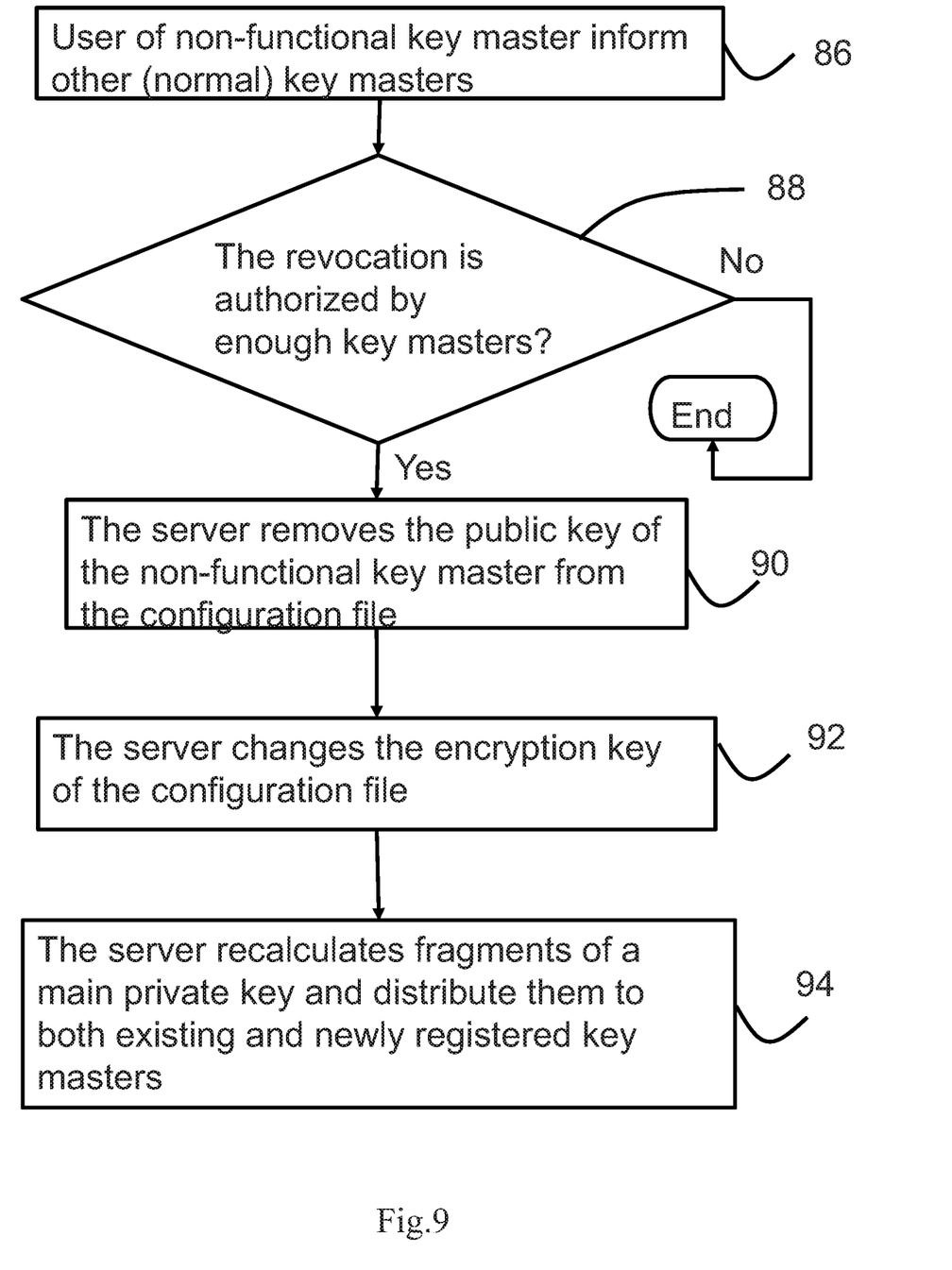
FIG. 9 is a flowchart of how to remove a key master from being able to communicate with the server in the system of FIG. 1.

Turning to FIG. 9. If the distributed key management system of FIG. 1 encounters a situation that a key master 24 is lost from its user, damaged, or otherwise not functional to complete operations required for the distributed key management system, then this non-functional key master 24 should be prohibited from communicating with the server 22 regarding the distributed key management function to avoid security risks. Firstly, in Step 86 the user of this non-functional key master 24 should inform other key masters 24 to remove the non-functional key master 24 from the system. After the revocation is authorized by enough other key masters 24 (which are normal in performing their functions) within a limited time frame in Step 88, the server 22 in Step 90 then removes the public key of the non-functional key master 24 from its configuration file 30, resulting in the non-functional key master 24 not being able to access the server 22 again. The server 22 then changes the encryption key 34 of its configuration file 30 in Step 92, and distribute the new encryption key 34y to all other key masters 24 in Step 94. In this embodiment, a new key master 34 will be added shortly after a non-functional key master 34 is removed, and since adding a new key master 34 already triggers a fragment re-calculation, the system does not re-calculate fragments 36 upon removal of the non-functional key master 24. However, a re-calculation is needed as re-calculating fragments 36 for every remaining key master 24 makes the key fragment 36 stored in the non-functional key master 24 useless forever (e.g. in case it is lost or stolen).

Figure 10A:
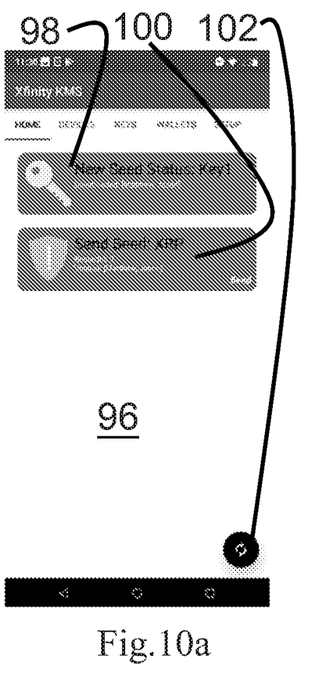
FIGS. 10a-10e are illustrations of user interfaces on a mobile phone as the key master according to an embodiment of the invention.

FIGS. 10a-10e shows the screenshots of a distributed key management app running on a key master (i.e. a key-holding device) according to an embodiment of the invention, where this key master is an Android phone having an "mini-HSM" which stores key material in a secure hardware (e.g., Trusted Execution Environment (TEE), Secure Element (SE)) of the Android device. FIG. 10a shows a home screen 96 of the app running full-screen on the current key master. The home screen 96 shows system status (e.g. region 98: download status of a new key) and all pending approvals (e.g. region 100: key consumer requesting a key). An on-screen button 102 is provided for the user of the key master to refresh the page by downloading the latest status and pending approval (s) from the server 22.

Figure 10B:
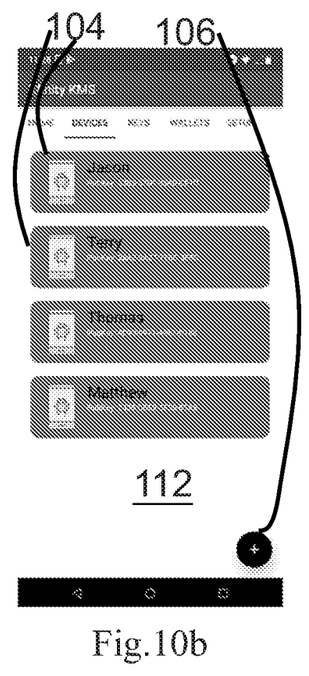

In FIG. 10b, a key master info screen 112 shows the list of all registered key masters of the distributed key management system to which the current key master belongs. Each tab 104 in Screen 112 corresponds to a registered key master including the current key master (which is "Jason" in this example) and their public keys. Note that as mentioned above the public key of a key master is used for another party in the system to decrypt message sent from the key master. An on-screen button 106 is provided for the current key master to add a new key master into the system, similar to Step 78 in FIG. 8. An "Add Device" request will then be shown on all key masters' home page 96 and waiting to be approved. A key master removal can be initiated by long clicking on an existing key master and then press "Yes" in the confirmation dialog (not shown here). A "Remove Device" request will then be shown on all key masters' home page 96 and waiting to be approved.

Figure 10C:
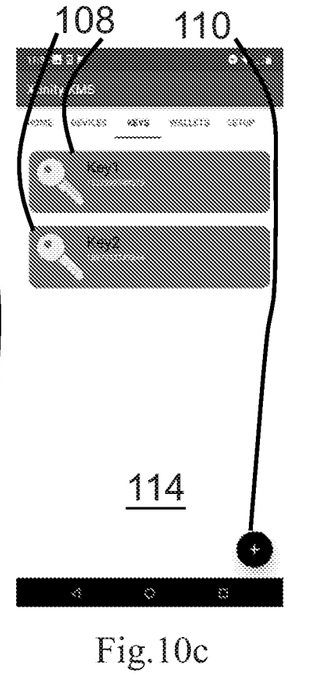

In FIG. 10c, a main private key info screen 114 shows the list of all main private keys that are currently held and maintained by the distributed key management system. In this example there are two main private keys Key1 and Key2, which are shown by two tabs 108. Note that Key1 and Key2 can be totally independent and irrelevant with each other. An on-screen button 110 is provided for the current key master to initiate creation of a new main private key, similar to the Step 46 in FIG. 6. A "New Key" request will then be shown on all key masters' home page 96 and waiting to be approved.

Figure 10D:
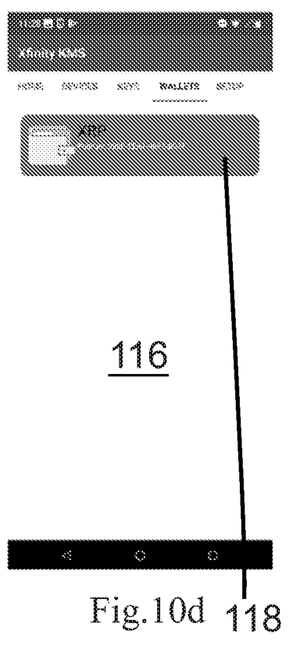

In FIG. 10d, a wallet info screen 116 shows the list of wallet(s) (i.e. key consumers) which are recorded by the distributed key management system. In this example, the label "XRP" is a special segment of any main private key, for example, it can be byte range 100-200 of any existing keys. In this example, a main private key is very long and can support up to 200 different labels. In this example, if the key request is approved, byte range 100-200 of all existing keys (e.g. Key1 and Key2) will be returned to the requesting wallet. And the label "XRP" will be locked to the request wallet's public key on the first successfully approved request. And thereafter, only the owner of this public key can make requests with the same label. This locked linkage can be removed by long clicking on region 118 and then click "Yes" on the confirmation dialog. A "Remove Wallet" request will then be shown on all key masters' home page 96 and waiting to be approved.

Figure 10E:
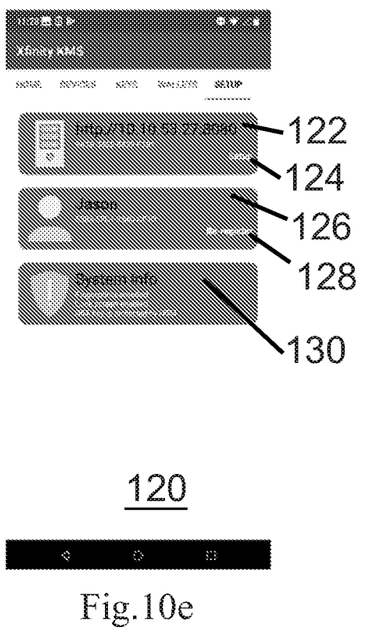

In FIG. 10e, a setup screen 120 shows some identify information and system information of the current key master. Tab 122 shows the IP address of the server in the distributed key management system, and an on-screen button 124 is further provided to enter another screen (not shown) to setup the server. Tab 126 shows the name of the user (i.e. "Jason", but it is blank if not registered yet) of the current key master, and an on-screen button 128 is further provided to re-register (shown as "register" if not registered yet) the key master to the server. Tab 130 shows information of the key master such as whether fingerprint protection is enabled, whether screen lock is enabled, and whether RSA keys are protected by HSM.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

For example, the distributed key management system in FIG. 1 shows one key consumer and five key masters. However, in variations of the invention there is apparently allowed any number of key-holding devices and key-requesting devices. There could be more than one key consumers requesting the same main private key, and equally possible there may be more or less key masters holding fragments of a main private key.

Various encryption algorithms/means are introduced in the embodiments mentioned above such as RSA, AES, fingerprint modules. Those skilled in the art should realize that other encryption algorithms and means can also be used and they still fall within the scope of the invention. Similar, the private key is split and reconstructed in the above embodiments using Shamir's Secret Sharing algorithm over Galois Field 256. Other types of key distribution and splitting mechanisms can also be used.

What is claimed is:

1. A distributed key management system, comprising
  a) a server;
  b) a plurality of key-holding computing devices adapted to communicate with the server, wherein each one of the plurality of key-holding computing devices is adapted to hold a different fragment of a private key; and
  c) a key-requesting computing device adapted to communicate with the server to request the private key;
  in response to the request for the private key, the server adapted to reconstruct the private key based on the fragments of the private key received from the plurality of key-holding computing devices,
  wherein the server is configured to recalculate the private key based on the fragments of the private key when a new key-holding computing device joins the plurality of key-holding computing devices, and afterwards distribute the fragments of the private key to the plurality of key-holding computing devices and the new key-holding computing device and wherein the server is configured to remove one of the plurality of the key-holding computing devices from being able to communicate with the server when a predetermined number of other key-holding computing devices authorizes a removal;
  the key-requesting computing device adapted to obtain the private key from the server, wherein the key-requesting computing device is adapted to produce a final key based on the private key received from the server such that the server has no access to the final key; and
  the server is configured to conduct an operation related to the private key only when the server has been unlocked by any one of the plurality of key-holding computing devices using a same encryption key held on all of the plurality of key-holding computing devices, wherein the server is able to read a configuration file which is compulsory for conducting the operation only when server is unlocked.

2. The system of claim 1, wherein the server is further adapted to reconstruct the private key based on the fragments received from at least a part of the plurality of key-holding computing devices.

3. The system of claim 2, wherein the server is adapted to reconstruct the private key using Shamir's Secret Sharing algorithm over Galois Field 256.

4. The system of claim 3, wherein the private key is a random number or is constructed using a random number, and the private key is a byte array with byte value in 0-255 range.

5. The system of claim 1, wherein the plurality of key-holding computing devices are smartphones belonging to different users.

6. The system of claim 1, wherein the server is locked when it has been restarted.

7. The system of claim 1, wherein the operation is:
  a) adding a new key-holding computing device;
  b) removing one of the plurality of the key-holding computing devices;
  c) generating a new private key; or
  d) approving a request from the key-requesting computing device.

8. The system of claim 1, wherein the key-holding computing devices are adapted to encrypt their respective fragments of the private key using a biometric authentication.

9. The system of claim 1, wherein the server is adapted to hold the configuration file which is associated with a respective public key for each one of the plurality of key-holding computing devices; the server being unable to read the configuration file unless it is unlocked using the encryption key by any one of the plurality of key-holding computing devices using the encryption key held on all of the plurality of key-holding computing devices.

10. A method for distributively managing keys, comprising the steps of:
  a) generating a private key by a server;
  b) appointing a plurality of key-holding computing devices, wherein the appointing comprises registering a first one of the plurality of the key-holding computing devices using a PIN and registering rest of the plurality of the key-holding computing devices by approval of all or a predefined minimum number of plurality of existing key-holding computing devices;
  c) splitting the private key into a plurality of fragments in accordance with a number of the key-holding computing devices and recalculating the privet key based on the plurality of fragments when a new key-holding computing device joins the plurality of key-holding computing devices and afterwards distributing the private key to the plurality of key-holding computing devices and the new key-holding computing device and wherein the server is configured to remove one of the plurality of the key-holding computing devices from being able to communicate with the server when a predetermined number of other key-holding computing devices authorizes a removal;
  d) distributing a different one of the plurality of fragments to each one of the plurality of key-holding computing devices; and
  the server is configured to conduct an operation related to the private key only when the server has been unlocked by any one of the plurality of key-holding computing devices using a same encryption key held on all of the plurality of key-holding computing devices; wherein the server is able to read a configuration file which is compulsory for conducting the operation only when server is unlocked.

11. The method of claim 10, wherein the server is adapted to hold the configuration file which is associated with a respective public key for each one of the plurality of key-holding computing devices;
  the server being unable to read the configuration file unless it is unlocked using the encryption key by any one of the plurality of key-holding computing devices using the encryption key held on all of the plurality of key-holding computing devices.

\* \* \* \* \*